(12) United States Patent
Sequeira et al.

(10) Patent No.: US 9,405,987 B2
(45) Date of Patent: Aug. 2, 2016

(54) METHOD FOR SAFELY IDENTIFYING MOVING OBJECT

(75) Inventors: Vitor Sequeira, Vila Nova de Gaia (PT); Gunnar Bostrom, Cadrezzate (IT)

(73) Assignee: The European Atomic Energy Community (EURATOM), Represented by the European Commission, Brussels (BE)

( * ) Notice: Subject to any disclaimer, the term of this patent is extended or adjusted under 35 U.S.C. 154(b) by 734 days.

(21) Appl. No.: 13/809,638

(22) PCT Filed: Jul. 15, 2011

(86) PCT No.: PCT/EP2011/062177
§ 371 (c)(1),
(2), (4) Date: May 30, 2013

(87) PCT Pub. No.: WO2012/007586
PCT Pub. Date: Jan. 19, 2012

(65) Prior Publication Data
US 2013/0286165 A1  Oct. 31, 2013

(30) Foreign Application Priority Data

Jul. 15, 2010  (EP) .................................... 10169743

(51) Int. Cl.
H04N 15/00       (2006.01)
H04N 13/02       (2006.01)
G06K 9/32        (2006.01)
G01S 17/87       (2006.01)
G01S 17/88       (2006.01)
G01S 17/89       (2006.01)

(52) U.S. Cl.
CPC ............. G06K 9/3216 (2013.01); G01S 17/87 (2013.01); G01S 17/88 (2013.01); H04N 13/0242 (2013.01); G01S 17/89 (2013.01)

(58) Field of Classification Search
CPC .......... H04N 13/0242; H04N 13/0239; H04N 13/0048
USPC .......................................................... 348/48
See application file for complete search history.

(56) References Cited

U.S. PATENT DOCUMENTS

| 4,349,112 | A | 9/1982 | Wilks et al. |
|---|---|---|---|
| 5,991,041 | A | 11/1999 | Woodworth |
| 2002/0140924 | A1 | 10/2002 | Wangler et al. |
| 2005/0243921 | A1* | 11/2005 | Au et al. ................... 375/240.12 |
| 2005/0243928 | A1* | 11/2005 | Hubrich et al. ........... 375/240.16 |
| 2007/0181685 | A1 | 8/2007 | Zhu et al. |
| 2008/0175491 | A1* | 7/2008 | Kondo ........................... 382/232 |
| 2009/0175343 | A1* | 7/2009 | Pearlstein ................. 375/240.16 |
| 2011/0103480 | A1* | 5/2011 | Dane ........................... 375/240.16 |
| 2011/0299770 | A1* | 12/2011 | Vaddadi et al. ............... 382/165 |
| 2012/0002725 | A1* | 1/2012 | Kazui ....................... 375/240.12 |

* cited by examiner

Primary Examiner — Chikaodili E Anyikire
(74) Attorney, Agent, or Firm — Nath, Goldberg & Meyer; Jerald L. Meyer; Christopher Thomas

(57) ABSTRACT

A non-contact identification and measurement method for identifying moving three-dimensional objects within an identification area, comprising the steps of detecting the presence of a moving object by scanning said identification area with a first eye-safe laser-based range detector system; discriminating between an object safe to be identified and an object not to be identified; for an object safe to be identified, activating a second laser-camera system and determining the speed and position of said object with said second laser-camera system; when said object safe to be identified reaches a position located in an active measurement area within said identification area, activating a third laser-camera system to acquire range data of said object.

16 Claims, 2 Drawing Sheets

METHOD FOR SAFELY IDENTIFYING MOVING OBJECT

RELATED APPLICATION

This application is a National Phase filing of PCT/EP2011/062177, filed Jul. 15, 2011, which claims priority from European Application No. 10169743.1, filed Jul. 15, 2010, the subject matter which is incorporated herein by reference in its entirety.

TECHNICAL FIELD

The present invention generally relates to a method of safely acquiring and identifying moving objects.

BACKGROUND ART

Providing Continuity of Knowledge (CoK) on feed, product and tails material is of ever-growing concern, in particular in fields relating to nuclear safety. Indeed, assuring Continuity of Knowledge for example in UF6 cylinder transportation and storage has to date posed a substantial challenge to the IAEA. Control of the stored unsealed cylinders is also a challenge.

Identification is one of the components required to be part of a surveillance module which also includes weighing scales and camera surveillance. Currently, UF6 cylinders can only be manually identified by steel ID plates, welded in place or riveted or bolted to the front of the cylinders, and cannot be authenticated by any reasonable method. The amount of work required to clearly identify and account the cylinders is substantial since the IAEA inspector would have to maintain a double accountancy: the facility identification code (no possible trusted authentication of the paper labeling) and the manufacturer labeling of the cylinder.

Using the existing surveillance cameras turned out not to be feasible since their resolution is too low in order to allow a unique identification. A second approach pursued by the IAEA was the use of dedicated unique identification tags (LBIMS project). However, this approach also had a number of significant drawbacks: Firstly, tampering with the tags was an obvious concern. Secondly, it turned out to be very difficult to find a fast, reliable and cost-efficient way to permanently attach the tags to the cylinders.

Technical Problem

It is an object of the present invention to provide a method and a device to measure and to univocally identify moving objects in a contact-less manner. The method and device should furthermore be safe for any personnel which might evolve in the area of measurement and identification. Finally, the method should be applicable to conditions where the movement of the object is not predetermined.

This object is achieved by a method as claimed in claim 1.

GENERAL DESCRIPTION OF THE INVENTION

In order to overcome at least part of the above-mentioned problems, the present invention proposes a non-contact acquisition and measurement method for identifying moving three-dimensional objects within an identification area, comprising the steps of (1) detecting the presence of a moving object by scanning said identification area with a first eye-safe laser-camera system, or preferably with a first eye-safe laser based range detector system, (2) discriminating between an object to be identified and an object not to be identified, (3) for an object to be identified, activating a second laser-camera system and determining the speed and position of said object with said second laser-camera system, (4) when said object to be identified reaches a position located in an active measurement area within said identification area, activating a third laser-camera system to acquire range data of said object.

It is known to use laser-camera systems for detecting obstacles or for monitoring moving objects, e.g. to determine the size and/or the shape thereof. Such systems are normally based on line scanners either mounted on a rotational and/or translational stage which moves the scanner in front of the object, or a fixed setup where the scanner itself remains still and the objects are transported in front of the scanner by a conveyor belt or similar.

Hence, known systems are based on setups where either the movement of the scanner or the movement of the object being scanned is known, thus making further processing relatively straightforward.

For example U.S. Pat. No. 5,991,041 describes a method and apparatus for measuring the size of objects on a moving conveyor using a photodiode light curtain to measure the height of the objects together with a two laser rangefinders which employ light detection cameras and pulse tachometers to measure the length and width of the objects on the conveyor.

However in order to derive the size of the objects, the speed of the conveyor should preferably be constant or if variable it must be known at any time. Furthermore, as the size of an object is derived from its (known) linear velocity with respect to the detection system, the actual movement must be limited to one (known) direction, such as the direction of a conveyor. Hence, this method is practically only applicable to objects moved in a predetermined manner by a conveyor.

A quite similar system is described in US 2007/0181685 A1, the main objective being however to identify and measure packages, the identification itself being done by detecting a bar code attached thereto independently of which side of the package it is located. The systems presented are also conveyor type system wherein the articles to be identified are passed through a confined area or tunnel. However, as already mentioned in the introduction, in some applications where tampering with applied identification means, such as labels, bar codes, etc. is an issue, such systems are not reliable enough.

Furthermore, although the general use of an eye-safe laser to identify moving objects is desirable especially in terms of safety considerations, further aspects, such as ambient light or changing lighting conditions, render a univocal identification of three-dimensional objects even more uncertain, especially in case of larger, less dedicated spaces.

Hence, the inventors were facing the problem that the actual identification of an object, not just monitoring the presence or even determining general shape and size properties of a moving object, cannot be effected by eye-safe lasers, especially not if the area to be monitored is of some extent.

However, the inventors found that it is possible to acquire a micrometer surface map even of a large moving object using more powerful lasers, thereby creating the basis for a univocal identification of moving objects. Indeed, it has been found that every object, even a priori identical ones, is unique and thus univocally identifiable if the resolution of the acquisition is high enough. However, for larger areas or longer distances the light emitted by common eye-safe lasers is not sufficient to provide satisfactory results and reliability.

Nevertheless, simply replacing the eye-safe laser system with more powerful laser systems is not an option in most applications, especially in cases where larger and relatively freely accessible active areas are to be monitored, as it cannot be excluded at any time that people enter the active area of the laser device. Indeed, larger areas are usually not dedicated to the passage of predetermined objects, but are susceptible to be entered inadvertently or not by personnel or even people not being aware of the situation and risks.

In order to overcome the above-mentioned problems, the invention thus proposes a method using an eye-safe laser to monitor a larger safety area essentially comprising a so-called identification area, said monitoring eye-safe system being operatively connected to more powerful second and third laser-camera systems which are deactivated by default. A camera or detector associated with the first (eye-safe) laser system permanently acquires data (images or spatial information) of the whole area. In the event a moving object reaches said area, subsequently acquired data (images or spatial information) will differ from one another, which is hence indicative of the presence of a moving object.

In a second step, the method provides for the discrimination between objects that should be identified and are thus safe to be identified and objects which should not be identified, such as non-expected objects or personnel moving inside the area. Hence if any non-expected objects or people enter the identification area, any laser device except the eye-safe laser must be (kept) deactivated.

Consequently, "object" or "objects" in the context of the present invention is to be understood as being either a living being or an inanimate thing or article. Furthermore, objects within the active area of a laser can a priori be classified into two groups: objects to be identified and objects not to be identified, i.e. which should or should not be acquired and/or identified by the second and third lasers.

In fact, objects not to be identified are either objects which are not safe to be identified, objects not expected within the active area (i.e. objects for which it is unsure whether they are safe to be identified or not) or objects which are expected within the area but are deemed of no interest for the purpose of identification (i.e. objects which need not to be identified).

Objects which are not safe to be identified are objects which can be damaged or injured by lasers more powerful than eye-safe lasers, i.e. more powerful than Class 1 or Class 1M. Therefore, an object which is expected, is of interest and can be safely acquired and/or identified with such lasers will be referred to more simply by the expression "object to be identified" or "scannable object", whereas an object which is unexpected, of no interest or could be damaged or injured by powerful lasers will be designated "object not to be identified".

If the general data acquired for the moving object corresponds to those of expected and "scannable" (to be identified) objects, a second laser-camera system is activated to detect the speed and position of the object. This information is not only required for the actual measurement, but also to determine when this measurement should be started, i.e. to determine when the object is in an appropriate position to start the measurement.

The actual measurement and identification is based on acquiring detailed range data of the object moving inside the range data measurement area inside the active measurement area.

It is to be noted that the present method is particularly advantageous in conveyor-less environments. However, this versatile method also applies to cases where the objects are transported in a predetermined manner, such as on conveyors.

In the present method, the first, second and/or third laser-camera systems can be based on laser triangulation using an associated camera, preferably a 3D camera. The laser-camera systems based on laser triangulation are preferably placed such that the objects are moving in a direction which is roughly or essentially transverse to the orientation of the laser.

In a particularly preferred embodiment, the first laser-camera system is a laser based range detection system (also known as laser rangefinder), in particular a laser based range detection system based on a Time-of-Flight measurement principle.

Any of said first, second and/or third laser-camera systems can comprise a plurality of spatially separated laser-camera/detector devices, if necessary or desirable. In particular, more than one third laser-camera/detector device can be useful if different types of objects with differing sizes and shapes are to be identified.

The first eye-safe laser is Class 1 or Class 1 M, preferably it is a Class 1 laser, whereas said second and third lasers are at least Class 2 lasers, such as Class 2, 2M, 3R, 3B or 4, preferably at least said third laser is an at least Class 3 laser, such as Class 3R or preferably 3B or even Class 4 (laser classes according to IEC 60825-1).

In particular, the first eye-safe system can be for example a system such as S3000 Professional CMS, Class 1, commercialized by SICK. The second system used for determining speed and position of the object preferably is a ruler type laser-camera system, such as a SICK/IVP Ruler 1200, Class 2M. The third laser-camera system is used for the actual measurement and should provide images or data which have a sufficient resolution. Hence, this third system preferably uses a high power laser, preferably Class 3 or 4. A practical example of such a system is a SICK/IVP 3D Camera Ranger E with a 100 mW line projector with an opening angle from 30 to 60°.

In a preferred embodiment of the method above, the presence detecting step (1) comprises the substeps of
(1a) scanning said identification area with at least one Class 1 safety laser beam source and acquiring images with an image acquisition device associated to each source using laser triangulation,
(1b) storing successively acquired images within an acquired image storing device,
(1c) identifying the presence of a moving object within the identification area by comparing consecutively acquired images to detect changes within the image,
(1d) if no changes have been detected, reverting to substep (1a).

In a preferred alternative, the presence detecting step (1) comprises the substeps of
(1a') scanning said identification area with at least one Class 1 safety laser beam source and acquiring spatial information with a range acquisition device associated to each source with Time-of-Flight measurement principle,
(1b') analyse sequential information from said range acquisition device and evaluate the presence of objects, "hits", in multiple pre-defined essentially rectangular zones whose respective longitudinal axis is roughly or essentially parallel to the direction of movement of the moving objects to be identified,
(1c') based on detected hits in some zones and absence of hits in other zones, i.e. a solid detection of moving "scannable" objects, a change can be identified,
(1d') if no changes have been detected, reverting to substep (1a').

The comparison and analysis of consecutively acquired data (images or spatial information) is preferably effected in a processing unit using known procedures. The data storing device and processing unit can be part of the first laser-based range detection or camera-laser system or they can be shared by all three systems. In general, the processing unit will be an industrial computer and play the role of a supervising system controller by running appropriate software.

The method above can also comprise further substeps in discriminating step (2):
(2a) comparing consecutively acquired data (images or spatial information) and changes therein to a set of criteria, wherein said set of criteria define the shapes of moving objects to be identified,
(2b) if said changes do not correspond to any of said criteria, deactivating any active second and third laser-camera system and reverting to step (1), preferably to substep (1a) or (1a').

Hence, when the presence of a moving object has been detected, the data (images or spatial information) are further analyzed in the processing unit in order to decide if the actual measurement should be started or if the object detected does not correspond to a "scannable" object. This will of course be the case if persons enter the area: no active measurement implying second and third systems will be started or if a measurement is being performed, second and third systems will be immediately deactivated.

However, in a further preferred embodiment, the discrimination does not only concern objects to be identified and objects which are not to be identified, but also more than one type of object within the objects to be identified. Hence, the set of criteria could for example be representative of different types of objects differing in size and/or shape, such as containers of different sizes. If the object falls within any of the predetermined criteria, the system concludes that the object is to be identified and proceeds to the next step.

In order to correctly identify a moving object it is indispensable to determine its speed and position at any time during measurement. In the present invention, this determination is done without contacting the object, neither directly, nor indirectly. Furthermore, as already mentioned above, the speed (and position) of the object does not need to be predetermined or preset by the use of a conveyor or similar.

The step (3) of determining speed and position of the object thus preferably further comprises the substeps of
(3a) activating a further, Class 2 to 4, laser beam source scanning an active measurement area within said identification area and an image acquisition device associated to said source,
(3b) storing successively acquired images within an acquired image storing device,
(3c) comparing consecutively acquired images to determine speed and position of said moving object,
(3d) activating measurement step (4) when the moving object reaches a position inside a range data measurement area within said active measurement area, and deactivating step (4) when the moving object leaves said range data measurement area.

In a further embodiment, the method described above further comprises in measuring step (4) the substeps of
(4a) activating at least one class 2 to 4 laser beam source, scanning a range data measurement area within said active measurement area and acquiring range data with a range data acquisition device associated to each source using laser triangulation,
(4b) storing acquired range data of said object within a range data storing device.

The range data acquired for an object are specific for that particular object and are thus susceptible of univocally identifying this object.

In a further preferred method, the measuring step (4) also comprises the substep of
(4c) comparing said acquired range data of an object with previously acquired data to identify objects already known.

By comparison with previously acquired data, it is possible to recognize objects which have already been identified previously. This allows to provide for Continuity of Knowledge as required in many safety relevant fields, especially in nuclear material transport and storage.

To further enhance the security within the area and to stimulate awareness of the personnel working in the surroundings of the identification area, the method above further comprises activating visual and/or acoustic safety signals before activating third laser-camera system or, preferably, second and third laser-camera systems. Said visual and/or acoustic safety signals are preferably active any time the third laser-camera system is active or, preferably, any time the second and third laser-camera systems are active.

The method above can be used in a number of fields and applications. A preferred operating field for this method is however the identification of UF6 cylinders, such as UF6 cylinders on trolleys.

Although the invention has been described with reference to a non-contact acquisition, measurement and identification method for identifying moving three-dimensional objects within an identification area, it is clear that the invention also encompasses a device for implementing the herein-described method and any one or more of the particular embodiments or features presented herein.

Such a device thus preferably comprises a first eye-safe laser-based range detector system capable of scanning an identification area, a second laser-camera system capable of scanning a reduced area within said identification area and a third laser-camera system capable of scanning a reduced area within said identification area, a storing device and a processing unit, wherein the activation and deactivation of the second and third laser-camera systems are controlled by the processing unit based on successively acquired images/spatial information from said first laser-based range detector system.

BRIEF DESCRIPTION OF THE DRAWINGS

A particularly preferred embodiment of the invention will now be described, by way of example, with reference to the accompanying drawings in which.

Further details and advantages of the present invention will be apparent from the following detailed description of several not limiting embodiments with reference to the attached drawings.

DESCRIPTION OF PREFERRED EMBODIMENTS

Figure 1:
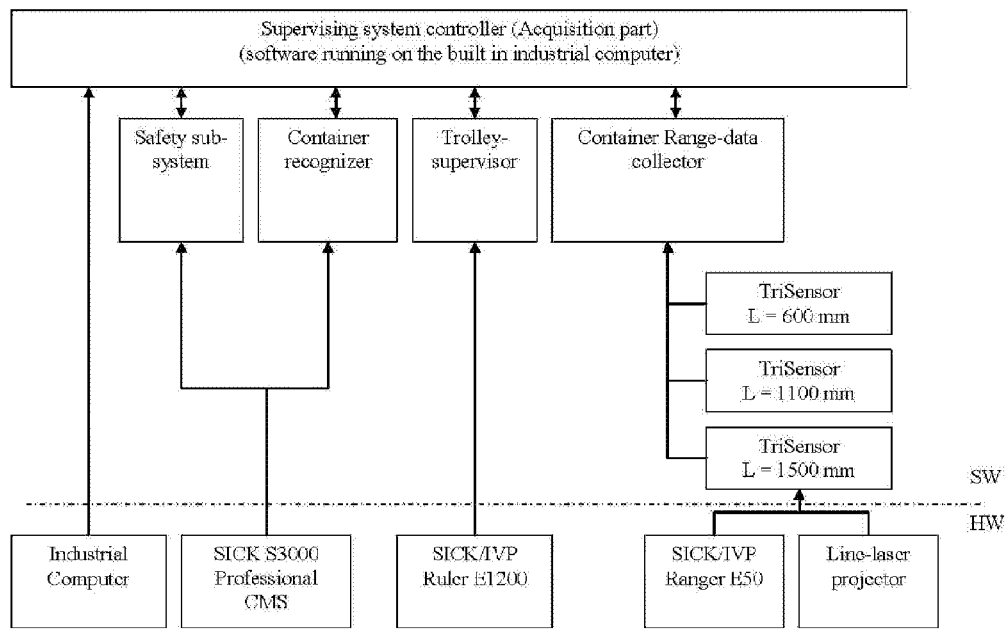
FIG. 1 is an overview of a system for identifying UF6 cylinders according to a preferred embodiment of the invention.

A preferred embodiment of the invention concerns the identification of UF6 cylinders moved on trolleys and is based on a number of separate and interacting sub-systems. A brief description and layout of the acquisition part sub-systems and hardware components are shown in FIG. 1.

Figure 2:
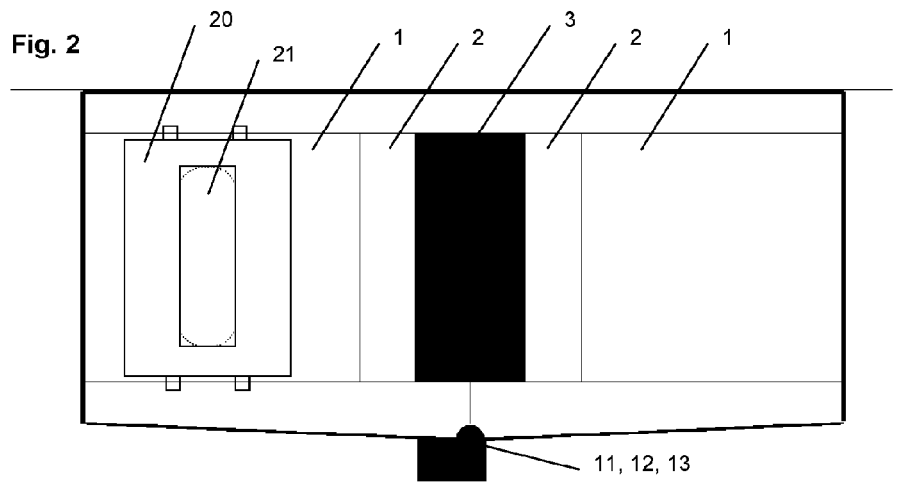
FIG. 2 is a plan view of the active areas used in the method of the invention.

The containers are transported on trolleys through a transfer hall which is split into different embedded areas 1, 2 and 3. The areas are used by the system to take certain actions as described throughout this document. FIG. 2 shows a sketch of the transfer hall and marks out the various areas, wherein identification area 1 contains active measurement area 2, which in turn contains range data measurement area 3.

The safety sub-system is designed to identify persons coming close during scanning which potentially could be affected by the laser light. The safety sub-system 11 is based on an industrial safety device, e.g. a Sick S3000 Professional CMS, and connects electrically to the power for all laser-emitting devices. This means that during scanning if the sensor detects an object approaching, the laser power is immediately switched off.

The hardware is based on an eye-safe SICK S3000 Professional CMS, which is always on and which monitors the passage between the measurement station and the trolley during scanning. This system is electrically connected to all power-laser.

The UF6 cylinder recognizer/discriminator is always on. It shares the hardware with the autonomous safety subsystem and is responsible for identifying which UF6 cylinder 21 type is approaching (IPC, 30B, 48Y), and coarsely following the UF6 cylinder in the transfer-hall. The embedded sensor is based on a SICK S3000 Professional CMS, which maintains roughly a 180 degree view of the hall, see FIG. 2. By continuously inspecting the pattern received, the sub-system can identify UF6 cylinders 21 on trolleys 20, which type and when they are approaching the measurement station. There is a built in false-detection filter which identifies only UF6 cylinders meaning that no consecutive scanning operation is performed when persons are passing in the transfer-hall.

The hardware, being the same as above, is based on an eye-safe SICK S3000 Professional CMS. The data is received by the system computer which continuously maintains the data processing and is always on. It informs other sub-systems during the following events:

a new UF6 cylinder 21 has been identified (unknown type), the UF6 cylinder of type X (X={IPC, 30B, 48Y}) is coming into the active measurement area 2, a UF6 cylinder is leaving the active measurement area 2.

The trolley supervisor is responsible for detecting and monitoring the trolley 20 while it remains in the active measurement area 2. This sub-system identifies the speed of the trolley 20 and communicates to the UF6 cylinder range-data collector when active data acquisition shall be started and stopped.

The trolley supervisor uses a SICK/IVP Ruler 1200, laser Class 2M for identification of the trolley speed and position and is aligned horizontally some decimeters above the ground. The laser is started only when the trolley 20 enters the active measurement area 2 and the laser is switched off whenever the trolley 20 passes out of the active measurement area 2.

The hardware is based on a SICK/IVP Ruler E1200, which is active during a passage of a trolley 20 in the active measurement area 2 and which is responsible for monitoring the trolley speed and position in the active measurement area 2. It informs other sub-systems about start and stop of active measurement.

Figure 3:
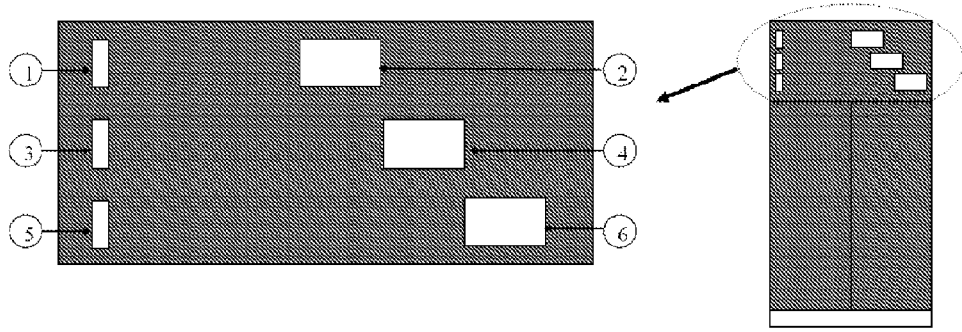
FIG. 3 is a schematic view of the data range acquisition systems for UF6 cylinders.

The UF6 cylinder range data collector sub-system 13 manages the range data acquisition. Based on the fact that there are three different potential UF6 cylinders and all have different diameter and offset from the station, three different triangulation sensors are maintained inside the cabinet, see FIG. 3. Based on the type of UF6 cylinder arriving, the correct system is selected for range-data acquisition. Each system is based on a calibrated camera-laser pair. The camera is a SICK/IVP 3D Camera Ranger E, and the line-laser projector is a 100 mW line projector with an opening (divergence) angle from 30 to 60 degrees depending on the cylinder. The laser-line is projected vertically.

The hardware is based on a line-projection laser, 660 nm centre wavelength, diode power 100 mW, laser class 3B, and a SICK IVP 3D Camera Ranger E50. It is active during a passage of a trolley in the active measurement area 2 and is responsible for acquiring the range data on the UF6 cylinder for further identification tasks.

Figure 4:
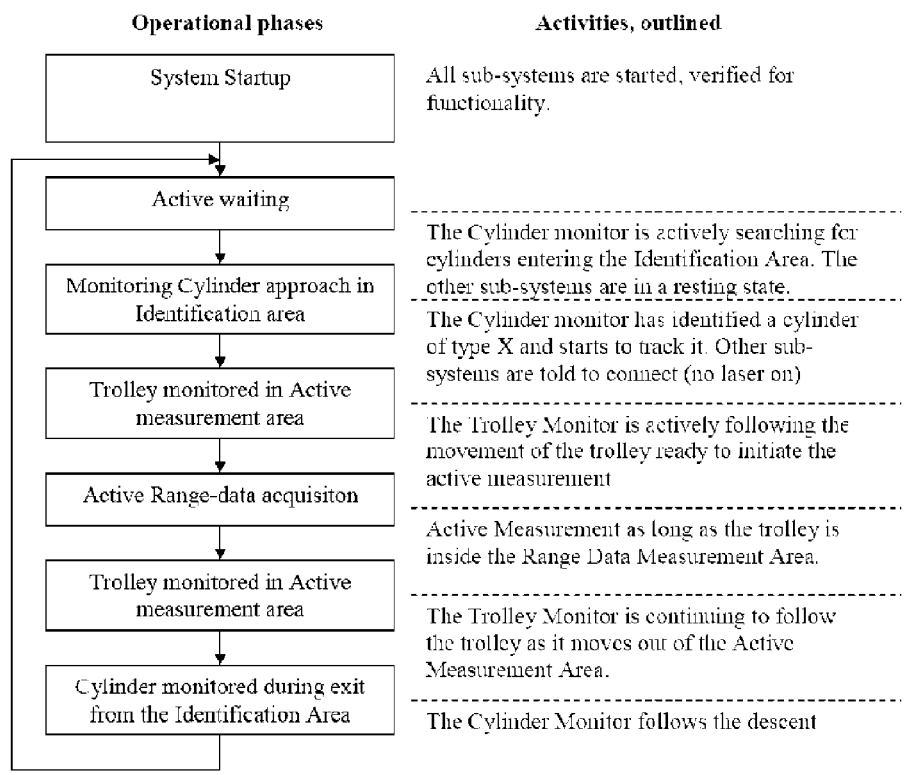
FIG. 4 is a diagram of the method of the preferred embodiment of the invention.

The system repeatedly performs the same activities and the major flow of procedure can be summarized in the flow-chart presented in FIG. 4.

All sub-systems are started and verified for functionality.

The cylinder monitor is actively searching for cylinders entering the identification area. The other sub-systems are in a resting state.

The cylinder monitor has identified a cylinder of type X and starts to track it. Other subsystems are told to connect (no laser on).

The trolley monitor is actively following the movement of the trolley ready to initiate the active measurement.

The measurement is active as long as the trolley is inside the range data measurement area.

The trolley monitor is continuing to follow the trolley as it moves out of the Active Measurement Area.

The usage of lasers in this system is mandatory. The acquisition technique is preferably based on triangulation, in particular using a specific 3D camera and laser light. The light needs to be projected onto the object with certain intensity in order for the camera to identify only the light in relation to other light-sources such as sun, ambient light, etc. All measures to achieve a high signal to noise are taken, meaning that a laser is used providing a narrow bandwidth, highly focusable light source which can be tuned to a from the systems point of view optimum power-level. The camera maintains matching wavelength filters giving the system best-possible working conditions.

The laser used in this third system is marked with a maximum diode-power of 100 mW. This means that the output optical power from an aperture reaches something like 80 mW considering all emitted light.

The international regulation covering laser safety classes and its use is IEC 60825-1.

For a brief rule of thumb one can consider that the amount of emitted energy from a visible laser onto an eye under constant non pulsed conditions should be below 1 mW. Considering that the aperture of the eye in extreme cases can have a diameter of 7 mm, the amount of energy passing through a hole of this diameter is a good measure of the danger imposed.

LEGEND

1 identification area
2 active measurement area
3 range data measurement area
11 first eye-safe laser-camera system, resp. first eye-safe laser based range detector system
12 second laser-camera system
13 third laser-camera system
20 trolley
21 UF6 cylinder

The invention claimed is:

1. A non-contact acquisition and measurement method for identifying moving three-dimensional objects within an identification area, comprising the steps of:
   (1) detecting the presence of a moving object by scanning said identification area with a first eye-safe laser-camera system,
   (2) discriminating between an object safe to be identified and an object not to be identified,
   (3) for an object to be identified, activating a second laser-camera system and determining the speed and position of said object with said second laser-camera system,
   (4) when said object to be identified reaches a position located in an active measurement area within said identification area, activating a third laser-camera system to acquire range data of said object, and
   wherein said first eye-safe laser is a Class 1 or Class 1M laser and said second and third lasers are at least Class 2 lasers;
   wherein discriminating step (2) comprises the substeps of:
   (2a) comparing consecutively acquired images and changes therein to a set of criteria, wherein said set of criteria define the shapes of moving objects to be identified, and
   (2b) if said changes do not correspond to any of said criteria, deactivating any active second and third laser-camera system and reverting to step (1).

2. The method according to claim 1, wherein said first laser-camera system is a laser-based range detector system or a laser-based range detector system based on Time-of-Flight measurement principle.

3. The method according to claim 2, wherein said second and/or third laser-camera systems are based on laser triangulation and 3D camera.

4. The method according to claim 1, wherein said first, second and/or third laser-camera systems comprise a plurality of spatially separated laser-camera devices.

5. The method according to claim 1, wherein said first eye-safe laser is a Class 1 laser, said second and third lasers are at least Class 3 lasers.

6. The method according to claim 1, wherein presence detecting step (1) comprises the substeps of:
   (1a) scanning said identification area with at least one Class 1 safety laser beam source and acquiring images with an image acquisition device associated to each source using laser triangulation,
   (1b) storing successively acquired images within an acquired image storing device,
   (1c) identifying the presence of a moving object within the identification area by comparing consecutively acquired images to detect changes within the image, and
   (1d) if no changes have been detected, reverting to substep (1a).

7. The method according to claim 1, wherein presence detecting step (1) comprises the substeps of:
   (1a') scanning said identification area with at least one Class 1 or 1M eye-safe laser beam source and acquiring spatial information with a range acquisition device associated to each source,
   (1b') analysing sequentially acquired spatial information from said range acquisition device and evaluate the presence of objects in one or more pre-defined rectangular zones, whose respective longitudinal axis is essentially parallel to the direction of movement of the moving objects,
   (1c') based on detected presence of objects in some zones and absence of hits in other zones, a change can be identified, and
   (1d') if no changes have been detected, reverting to substep (1a').

8. The method according to claim 1, wherein speed and position determining step (3) comprises the substeps of:
   (3a) activating a further Class 2 laser beam source scanning an active measurement area within said identification area and an image acquisition device associated to said source,
   (3b) storing successively acquired images within an acquired image storing device,
   (3c) comparing consecutively acquired images to determine speed and position of said moving object, and
   (3d) activating measurement step (4) when the moving object reaches a position inside a range data measurement area within said active measurement area, and deactivating step (4) when the moving object leaves said range data measurement area.

9. The method according to claim 1, wherein measuring step (4) comprises the substeps of:
   (4a) activating at least one Class 3 laser beam source, scanning a range data measurement area within said active measurement area and acquiring range data with a range data acquisition device associated to each source using laser triangulation, and
   (4b) storing acquired range data of said object within a range data storing device.

10. The method according to claim 9, wherein measuring step (4) further comprises the sub step of:
    (4c) comparing said acquired range data of an object with previously acquired data to identify objects already known.

11. The method according to claim 1, further comprising activating visual and/or acoustic safety signals before activating third laser-camera system or second and third laser-camera systems.

12. The method according to claim 11, wherein said visual and/or acoustic safety signals are continued when third laser-camera system is active or when second and third laser-camera systems are active.

13. The method according to claim 1, wherein the moving objects are UF6 cylinders.

14. A device for implementing the method according to claim 1.

15. The device according to claim 14, comprising a first eye-safe laser-based range detection system capable of scanning an identification area, a second laser-camera system capable of scanning a reduced area within said identification area and a third laser-camera system capable of scanning a reduced area within said identification area, a storing device and a processing unit, wherein the activation and deactivation of the second and third laser-camera systems are controlled by the processing unit based on successively acquired data from said first laser-based range detection system.

16. The method according to claim 1, wherein at least said third laser is a Class 3 or 4 laser.

* * * * *